United States Patent [19]

Hirate

[11] Patent Number: 5,775,215
[45] Date of Patent: Jul. 7, 1998

[54] MACHINE TOOL EQUIPPED WITH MARKING APPARATUS

[75] Inventor: Takashi Hirate, Buena Park, Calif.

[73] Assignee: Amada America, Inc., Buena Park, Calif.

[21] Appl. No.: 574,367

[22] Filed: Dec. 18, 1995

Related U.S. Application Data

[63] Continuation-in-part of Ser. No. 350,448, Dec. 7, 1994, abandoned.

[51] Int. Cl.$^6$ ............................................. B41F 17/00
[52] U.S. Cl. ............................ 101/4; 101/35; 29/34 R
[58] Field of Search ......................... 101/3.1, 4, 35; 400/127, 128, 134; 29/33 R, 34 R, 560

[56] References Cited

U.S. PATENT DOCUMENTS

| | | |
|---|---|---|
| 3,054,494 | 9/1962 | Rizetti . |
| 3,312,562 | 4/1967 | Miller . |
| 3,606,162 | 9/1971 | Lehmann . |
| 4,089,262 | 5/1978 | Sopora . |
| 4,522,521 | 6/1985 | Scott . |
| 4,557,191 | 12/1985 | Speicher . |
| 4,591,279 | 5/1986 | Speicher . |
| 4,648,184 | 3/1987 | Schuir et al. . |
| 4,810,867 | 3/1989 | Speicher . |

FOREIGN PATENT DOCUMENTS

| | | |
|---|---|---|
| 4-34947 | 6/1992 | Japan . |
| 4-44265 | 10/1992 | Japan . |
| 2002694 | 2/1979 | United Kingdom . |

*Primary Examiner*—Ren Yan
*Attorney, Agent, or Firm*—Wigman, Cohen, Leitner & Myers, P.C.

[57] ABSTRACT

A machine tool system includes a machine tool and a marking apparatus. The marking apparatus can mark parts-data on workpiece parts at high speed, without occupying any tool mounting station and without having any limitation in the number, the sequence direction, the size and the type font of characters to be marked. A mount base (33) is fixedly attached to a frame (1) of the machine tool. A marking head (51) is mounted on the mount base (37) so as to be movable in the vertical direction. The marking head (51) is provided with a pneumatic stylus (77) movable horizontally both in the X- and Y-axis direction. A parts-data of dot matrix type can be engraved on the workpiece parts by moving the stylus (77) in the X- and Y-axis directions.

12 Claims, 8 Drawing Sheets

Y-axis

X-axis

MACHINE TOOL EQUIPPED WITH MARKING APPARATUS

This is a continuation-in-part application of U.S. application Ser. No. 08/350,448, filed on Dec. 7, 1994, now abandoned.

BACKGROUND OF THE INVENTION

1. Field of the Invention

The present invention relates to a machine tool equipped with a marking apparatus, such as a turret punch press, a laser processing machine, a band saw machine, and the like, and more specifically, to a machine tool equipped with marking apparatus that is suitable for use to mark various data on workpiece parts.

2. Description of the Prior Art

Conventionally, various data are marked on workpiece parts in the machine tool. Such data (referred to hereinafter as parts-data) include a parts number, a revised parts number, the production date, the maker name, and the like. In the case of a turret punch press, for instance, these parts-data are marked on workpiece parts by use of the pressing function of the turret punch press itself.

Two types of apparatus have been so far known for apparatus for marking parts-data on workpiece parts in turret punch press: In the apparatus of the first type, a marking tool having a predetermined number of type-tips is mounted at tool mounting station of the turret punch press. The marking tool is struck by a striker to mark workpiece parts with character sequences corresponding to the shapes of the type-tips. In the apparatus of the second type, a marking tool having a punch body formed with linear projection is mounted at one of the tool mounting stations of the turret disk, and this punch body is struck by the striker, as disclosed in Japanese Published Unexamined (Kokai) Patent Application No. 4-34947 or Utility Model Application No. 4-44265, for instance. In the apparatus of the second type, for each strike by the striker, the workpiece is moved to a predetermined position by a movable workpiece table, and the marking tool is rotated to a predetermined angular position by use of an index mechanism. As a result, segment characters and symbols composed of various line segments are marked on the workpiece parts.

In the conventional apparatus of the first type, however, the marked character sequence is fixed. Thus when a multiple number of workpiece parts of different kinds are processed in the punch press or when serialized part numbers are required, various marking tools must be prepared according to the kinds of the workpiece parts. In the preparation of the marking tools, the operator must assemble type-tips according to the kinds of workpiece parts before mounting. This results in that a long set-up time is inevitably required for the marking tool, in comparison with the ordinary tooling set-up time. In addition, several tool mounting stations on the turret are occupied by the marking tools. Thus there exists a problem in that a number of tool mounting stations for punching processing is decreased, so that the availability factor on the turrets is inevitably reduced.

Further, in the turret punch press, a nesting system is recently used, whereby arrangement angles of workpiece parts relative to the rest of the workpiece can be automatically changed for using a predetermined size of workpiece (standardized plate material) most efficiently. However, in the apparatus of the first type, it is impossible to change the direction of the marking character sequence in accordance with the changed arrangement angles of the workpiece parts. In more detail, with reference to FIG. 5, there has been developed such program software that arrangement angles of a number of the workpiece parts P are changed in a standardized workpiece W in order to use the workpiece material most efficiently. For example, a long sideways part P may be rotated by 90 degrees to position it as a long lengthwise part. (This software may be referred hereafter to a nesting software). In the marking apparatus of the first type, however, the arrangement angle of the marking tool cannot be changed in accordance with the decision of the nesting software. Thus the nesting software may be under utilized, with the result that the optimization of use of workpiece material is sacrificed.

In the apparatus of the second type, on the other hand, only a single marking tool is loaded for the turret punch press, and can cope with the nesting software. However, since the markings are performed by striking only one segment of characters at time and symbols, the kind of, the type font of, and the size of the characters and symbols are limited and therefore cannot be modified. Further, since the marking tool must be struck many times to form one character, there exists a problem in that it takes a relatively long marking time.

In addition, in the apparatus of the second type, the marking tool occupies one of tool mounting stations provided with indexing mechanism, reducing the turret punch press's limited number of tool mounting stations with indexing mechanism. Thus in the apparatus of the second type, the marking tool is low in strike efficiency and productivity.

SUMMARY OF THE INVENTION

With these problems in mind, therefore, it is the object of the present invention to provide a machine tool equipped with a marking apparatus, which can mark parts-data on workpiece parts at high speed, without any limitation in the marked characters and symbols and without occupying any tool mounting area (such as the tool mounting station), while enabling the direction, the size, and the type font of marked character sequence to be change freely.

To achieve the above-mentioned object, the present invention provides a machine tool equipped with marking apparatus, which includes a control means for controlling the machine tool and marking apparatus, wherein commands for controlling the marking apparatus are modified when commands for controlling the machine tool are modified by a nesting software so that a plurality of parts are arranged at suitable positions and orientations in the workpiece.

The marking apparatus preferably includes: a mount base mounted on a frame of the machine tool; a stylus body supported by the mount base so as to be movable in a direction perpendicular to a surface of a workpiece table of the machine tool; a carriage supported by the stylus body so as to be movable in a first direction parallel to the workpiece table surface; a stylus support member supported by the carriage so as to be movable in a second direction parallel to the workpiece table surface and perpendicular to the first direction; and a pneumatic stylus supported by the stylus support member so as to face the workpiece table surface.

The marking apparatus preferably includes a vertical actuator mounted on the mount base member, for reciprocatingly moving the stylus body in the direction perpendicular to the workpiece table surface; a first actuator mounted on the stylus body, for moving the carriage in the first direction; a second actuator mounted on the carriage, for moving the stylus support member in the second direction;

and marking apparatus control means for controlling operation of the vertical, first, and second actuators on the basis of marking data.

Further, it is preferable that the mount base is supported on the frame via at least one vibration insulating member. Further, it is also preferable that the marking control means is an NC unit for retrieving marking data from NC processing program including NC data for the machine tool. Further, the machine tool may be provided with a machine tool NC unit for controlling the same, and the marking apparatus control means is connected to the machine tool NC unit to receive a marking start command signal from, and transmit a marking end command signal to the machine tool NC unit.

In the marking apparatus according to the present invention, the marking head including the carriage, the stylus support member, the stylus, and the like are moved by the vertical actuator near the workpiece table surface of the machine tool. When compressed air is supplied to the stylus, the parts-data are engraved in dot matrix manner on the workpiece parts mounted on the workpiece table. Specifically while the compressed air is being supplied to the stylus, the first actuator is moved in the first (X-axis) direction by the first actuator, and the second actuator is moved in the second (Y-axis) direction by the second actuator, to change the position of the stylus. In this way, various dot-matrix characters and symbols are engraved on workpiece parts.

Further, in case where the mount base member is mounted on the frame via a vibration insulating member, it is possible to prevent the vibrations, which are generated by the machine tool, from being directly transmitted to the marking head.

Further, the marking head can be controlled in association with the NC processing program, by retrieving marking data from the NC processing program including NC program for the machine tool.

Further, in case where the marking apparatus control means is connected to the machine tool NC unit to receive a marking start command signal from the machine tool NC unit and to transmit a marking end command signal to the machine tool NC unit, it is possible to control the machine tool and the marking apparatus to operate in related manner.

According to further aspect of the present invention, when NC commands for the punch press are modified by the nesting software, NC commands for the marking apparatus are also modified by the nesting software. Thus, the workpiece can be used most effectively, and a marking can be easily performed at suitable locations and orientations in the part arranged or nested in the workpiece.

According to still further aspect of the present invention, a workpiece positioning device for positioning a workpiece relative to the punch process position under a striker can also position the workpiece relative to a marking apparatus. Specifically, when a workpiece is formed with a plurality of parts on which marking is impressed, the workpiece positioning device selectively position each of the parts below the marking apparatus. Thus, the positioning of the parts relative to the marking apparatus is carried out quickly and precisely.

DETAILED DESCRIPTION OF THE EMBODIMENTS

Figure 1:
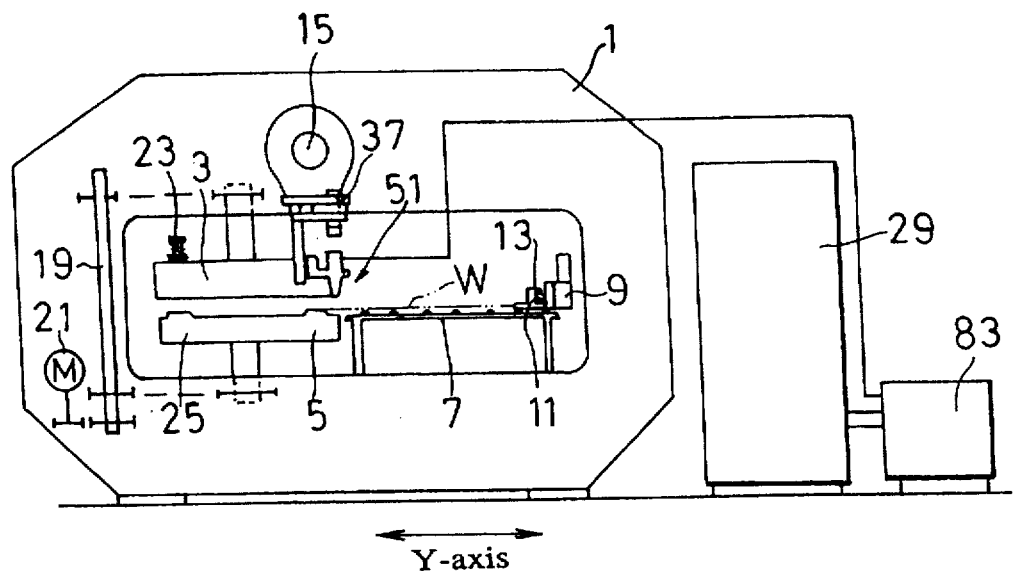
FIG. 1 is a side view showing an embodiment machine tool equipped with the marking apparatus according to the present invention.
Figure 2:
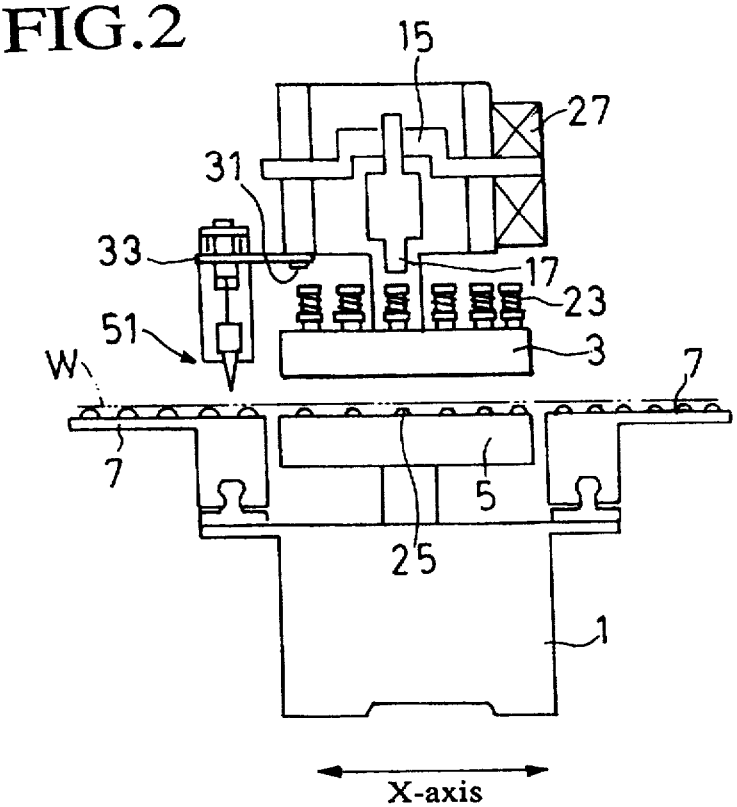
FIG. 2 is a front view showing the marking apparatus shown in FIG. 1.

An embodiment of the present invention will be described hereinafter with reference to the attached drawings. FIGS. 1 and 2 shows an embodiment of the machine tool equipped with a marking apparatus according to the present invention. Here, the machine tool is an NC turret punch press.

In these drawings, an upper turret disk 3 and a lower turret disk 5 are supported on a frame 1 so as to be rotatable about the same vertical axis. Punches 23 are mounted on the upper turret disk 3, and dies 25 are mounted on the lower turret disk 5, respectively. Further, on the frame 1, a striker 17 is mounted. Specifically, this striker 17 is driven by a crankshaft driving device 27 via a crankshaft 15 to strike the punch 23. In addition, on the frame 1, a movable table 7 to which a carriage base 9 is attached is mounted so as to be movable in Y-axis direction (in the lateral direction in FIG. 1). On the carriage base 9, a carriage 11 to which a workpiece clamp 13 is fixed is mounted so as to be movable in X-axis direction (in the longitudinal direction in FIG. 1).

The workpiece clamp 13 is for clamping a workpiece W to be processed. Therefore the workpiece W to be processed which is clamped by the workpiece clamp 13 can move along the X- and Y-axis on the table 7. A combination of the movable table 7, the carriage 11, and the clamp 13 is referred hereinafter to as a workpiece positioning device.

The upper and lower turret disks 3 and 5 are linked with each other and driven by a turret drive motor 21 via a synchronous transmission mechanism 19. Therefore the upper and lower turret disks 3 and 5 are driven by the turret drive motor 21 in synchronism with each other so as to be located (indexed) at any desired angular position.

The upper and lower turret disks 3 and 5 hold a plurality of punch-and-die pairs 23, 25 at respective tool holding stations. Therefore after having been indexed to a punching position by the rotation of the turret disks 3 and 5, the punch 23 on the upper turret disk 3 is struck by the striker 17 to process a workpiece W in cooperation with a corresponding die 25 on the lower turret disk 5.

The movable table 7 is moved in the Y-axis direction and further the carriage 11 is moved in the X-axis direction by respective servomotors (not shown). These servomotors, the turret drive motor 21, and the crankshaft driving device 27 are all connected to a punch press NC unit 29. Therefore the rotation of these motors 21 and driving device 27 are all controlled in accordance with NC processing program executed by the punch press NC unit 29.

As best shown in FIG. 2, a first mount base plate 33 is fixed to the frame 1 with bolts 31 so as to extend horizontally over the workpiece table 7 and beyond the side end of the frame 1.

Figure 3:
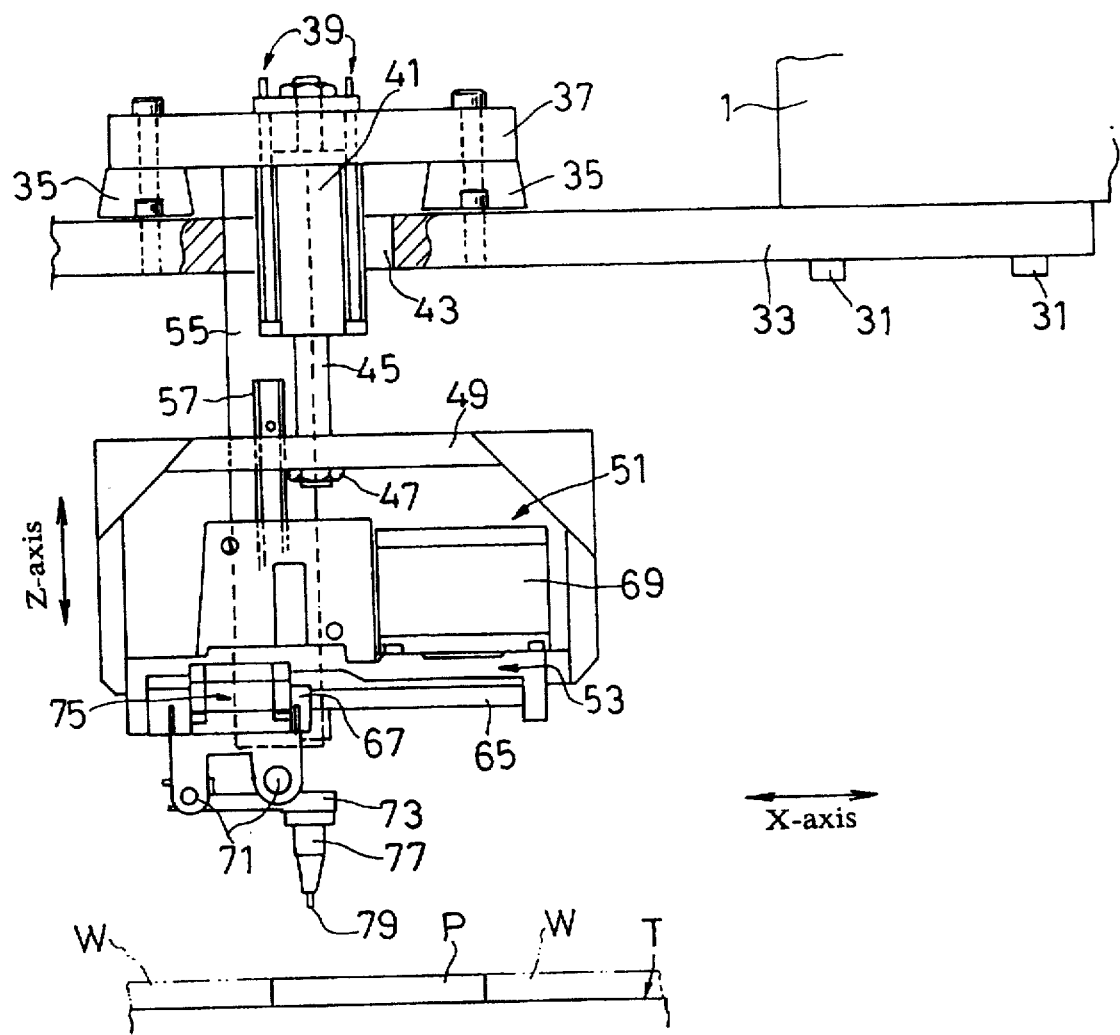
FIG. 3 is a detailed front view showing a portion of the embodiment of the marking apparatus shown in FIG. 1.
Figure 4:
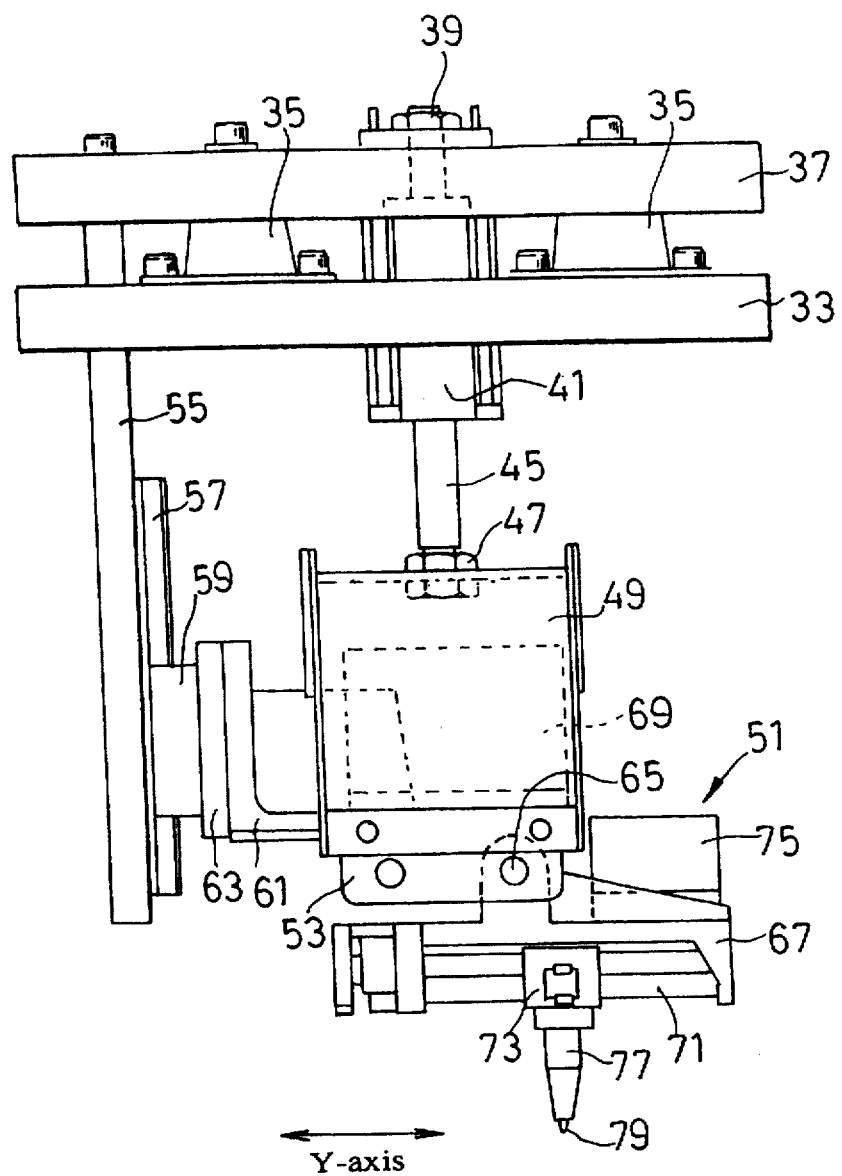
FIG. 4 is a detailed side view showing the portion of the embodiment shown in FIG. 1.
Figure 5:
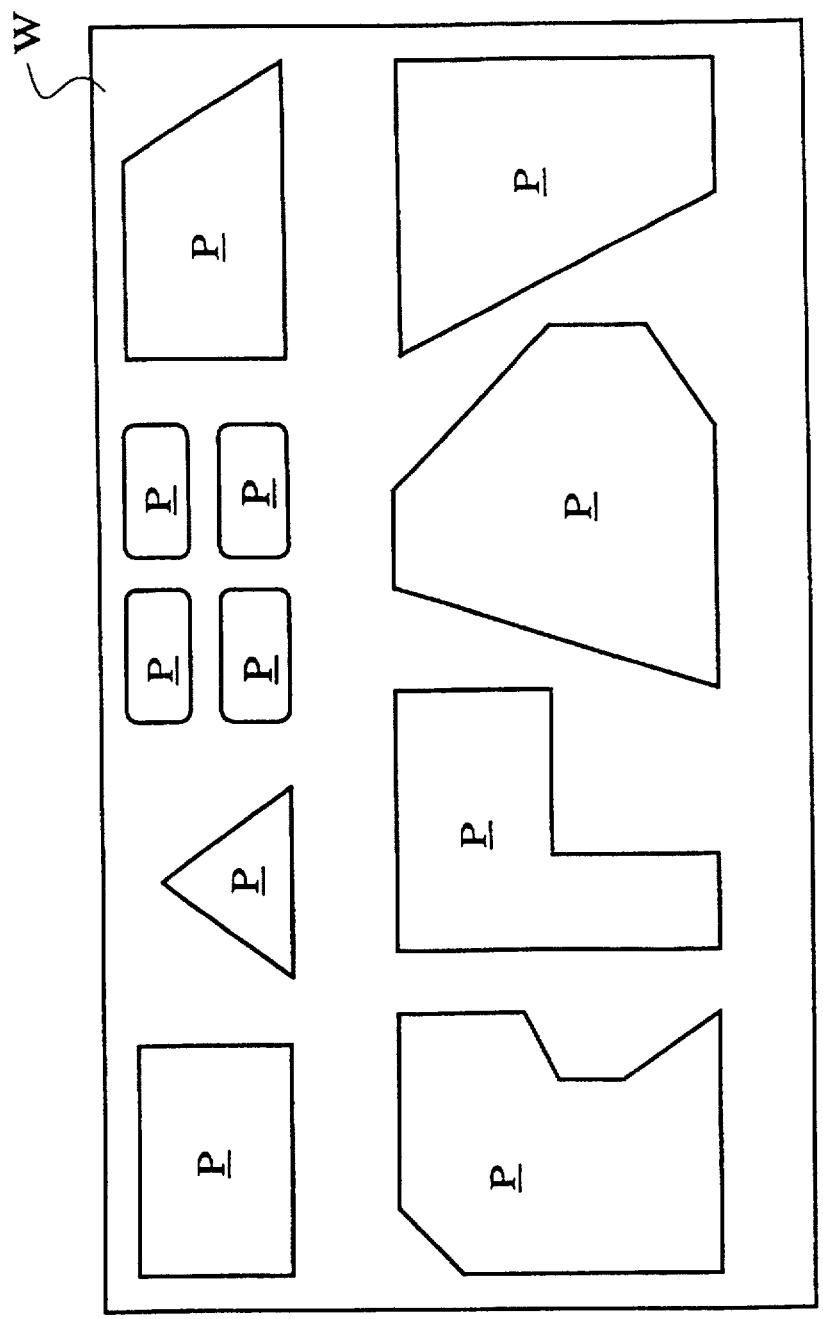
FIG. 5 is an illustration for assistance in explaining the optimum arrangement of the workpiece parts P in a standardized workpiece, which can be determined by the nesting software to make best use of the workpiece material.

Specifically, as shown in FIGS. 3 and 4, a second mount base plate 37 is mounted on the first mount base plate 33 with a damping rubber 35 interposed between the two mount plates 33 and 37. The damping rubber 35 acts as a vibration insulating member. Thus under the normal conditions, the first and second mount base plates 33 and 37 are kept horizontal with respect to the X-Y plane of the NC turret punch press, that is, with respect to the surface T of the workpiece table 7.

A pneumatic cylinder device 41 (acting as a vertical actuator) is attached to the second mount base plate 37 with a bolt-and-nut pair 39 so as to suspended from the second mount base plate 37. This pneumatic cylinder device 41 extends downward and loosely passes through an opening 43 formed in the first mount base plate 33. Specifically, the pneumatic cylinder device 41 extends in a Z-axis direction perpendicular to the workpiece table surface T, and is provided with a piston rod 45. A yoke-shaped mount bracket 49 is fixed to the lower end of the piston rod 45 with a nut 47 so as to suspend from the piston rod 45. The mount bracket 49 supports a stylus body 53 of a marking head 51 in the horizontal direction.

On the second mount base plate 37, a vertical guide support plate 55 is further provided so as to suspend from the second mount base plate 37. The guide support plate 55 extends downward, that is, in the direction perpendicular to the workpiece table surface T. The vertical guide support plate 55 supports a linear guide rail 57 also extending in the vertical direction. A slider 59 fixed to the stylus body 53 via an L-shaped link arm 61 and a plate 63 is engaged with the linear guide rail 57 so as to be movable in the vertical direction.

In the construction as described above, the pneumatic cylinder device 41 can reciprocatingly move the marking head 51 together with the mount bracket 49 in the vertical direction, that is, in the direction perpendicular to the workpiece table surface T. During the movement, the marking head 51 and the mount bracket 49 are guided by the linear guide rail 57.

Further, the stylus body 53 of the marking head 51 supports an X-axis guide bar 65 extending horizontally in the first axis (X-axis) direction and in parallel to the workpiece table surface T. On this X-axis guide bar 65, a carriage 67 is supported so as to be movable in the axial direction of the bar 65, that is, in the first axis (X-axis) direction. An X-axis drive motor 69 is mounted on the stylus body 53 for moving the carriage 67 in the X-axis direction via a timing belt (not shown).

The carriage 67 in turn supports a Y-axis guide bar 71 extending horizontally in the Y-axis (second axis) direction perpendicular to the X-axis (first axis) direction and in parallel to the workpiece table surface T. On this Y-axis guide bar 71, a stylus support member 73 is supported so as to be movable in the axial direction of the bar 71, that is, in the Y-axis (second axis) direction. Further, a Y-axis drive motor 75 is mounted on the carriage 67 for moving a stylus support member 73 in the Y-axis direction via a timing belt (not shown).

On the stylus support member 73, an air-driven type stylus 77 is provided extending downward and facing the workpiece table surface T. The stylus 77 is provided with a sharp marking (engraving) pin 79. When a compressed air is supplied to the stylus 77, the marking pin 79 is lowered against an elastic force of a spring (not shown) provided in the stylus 77. Once the marking pin 79 is lowered, a drain port (not shown) is opened to release the compressed air, so that the marking pin 79 returns to the original position by the elastic force of the spring. The above-mentioned operation is repeated at high speed by continuously supplying the compressed air into the stylus 77.

Near the stylus body 53, two pneumatic solenoid valves (not shown) are mounted to control the amount of the compressed air supplied to the stylus 77 from a compressed air source (not shown).

The operation of the pneumatic cylinder device 41, the X-axis drive motor 69, the Y-axis drive motor 75, the pneumatic solenoid valves are all controlled by a marking apparatus NC unit 83 (see FIG. 1).

The marking apparatus NC unit 83 and the punch press NC unit 29 are connected to each other in bidirectionally communicatable manner. Specifically, the marking apparatus NC unit 83 can receive a marking start command from the punch press NC unit 29, and send a marking end command to the punch press NC unit 29. Upon receiving the marking start command, the marking apparatus NC unit 83 starts marking operation. On the other hand, upon receiving the marking end command from the marking apparatus NC unit 83, the punch press NC unit 29 starts punching processing.

Further, the marking apparatus NC unit 83 is adapted to receive NC processing program under on-line or off-line condition, and retrieve therefrom NC program codes for the marking operation. Here the NC program codes for the marking operation are described by meta codes called "$MARK". The marking apparatus NC unit 83 stores the retrieved NC program codes in a fixed disk or a random-access memory as marking data, and further sends the remaining NC processing program to the punch press NC unit 29.

Therefore during the preparation of the NC processing program for the turret punch press, the NC program for the marking apparatus can be simultaneously prepared by describing the marking data using the meta codes $MARK.

Further, when the nesting software is applied to the NC processing program, the marking apparatus NC unit 83 automatically modifies the NC program code for marking processing according to the nesting software. Therefore even if the arrangement angle of a workpiece part P is changed with respect to the workpiece W in accordance with the nesting software, parts-data are always marked at predetermined positions and at predetermined angles on the workpiece part P.

The operation of the marking apparatus as described above will be described hereinafter.

First, the marking apparatus NC unit 83 picks out the NC program codes ($MARK) for a marking processing from the NC processing program which is stored in the NC unit 83 and includes an NC processing program for punching processing.

Then the marking apparatus NC unit 83 sends to the punch press NC unit 29 a command G70 for moving the workpiece W relative to the marking head 51. On the basis of this command, the movable table 7 is moved in the Y-axis direction, and the carriage base 9 is moved in the X-axis direction, both under control of the punch press NC unit 29. Thus the workpiece part P is positioned relative to the marking apparatus, together with the workpiece W that is clamped by the workpiece clamp 13. Specifically, a marking start position of the workpiece part P is positioned just under a home position of the marking pin 79. Here, it should be noted that the home position of the marking pin 79 is separated by a predetermined distance from the punching position of the striker 17 in both the X- and Y-axis directions. Accordingly, in marking operation, it is necessary to change the position of the workpiece W in the X- and Y-axis directions by the predetermined distances. Under consideration of the foregoing, the workpiece part P is moved relative to the marking head 51 on the basis of a positioning command from the punch press NC unit 29.

After a workpiece part P to be marked is located under the home position of the marking pin 79, the punch press NC unit 29 transmits a marking start signal to the marking apparatus NC unit 83.

When the marking start signal is received by the NC unit 83, the marking head 51 is lowered, together with the mount bracket 49, from a standby position to a marking position by the pneumatic cylinder device 41 on the basis of a command signal from the marking apparatus NC unit 83. Then the marking head 51 is positioned just above the workpiece part P to be processed and placed on the workpiece table surface T.

After that, the pneumatic solenoid valves are opened to start the marking operation by the stylus 77. Therefore the marking pin 79 strikes the workpiece part P to mark the workpiece part P with parts-data with dot matrix.

In the above operation, the X-axis drive motor 69 is driven to move the carriage 67 in the X-axis direction on the basis of commands from the marking apparatus NC unit 83. Similarly, the Y-axis drive motor 75 is driven to move the stylus body 73 in the Y-axis direction on the basis of commands from the marking apparatus NC unit 83. Thanks to the motions in the X- and Y-axis directions, the marking pin 79 of the stylus 77 moves horizontally to change dotting positions on the workpiece part P. Thus parts-data including various characters, numerals, and symbols are marked or engraved on the workpiece part P in dot matrix manner.

Contents of the parts-data, size of the characters, type font of the characters, and direction of the character sequences are all determined by marking data stored in the marking apparatus NC unit 83. Further the maximum values of the character size, the character sequence, and the like can be determined freely for example by manipulation of a word processor at the time when the marking data are prepared (e.g., by functions of character inputs, edition, etc.). It is to be noted that the marking apparatus of the present invention can mark all the characters and non-control codes defined by ASCII (American Standards Code for Information Interchange). Further, where necessary, it is also possible to mark Chinese characters prescribed by JIS (Japanese Industrial Standard). Still further, the marking apparatus of the present invention can mark or engrave a graphic images on the workpiece part.

The number and the size of characters, and the direction of the character sequence, the size of graphic images, and the like to be markable on workpiece parts depend on the maximum X-axis stroke of the carriage 67 and the maximum Y-axis stroke of the stylus support member 73. Specifically, when the maximum X-axis stroke is about 100 mm and the maximum Y-axis stroke is about 80 mm, the arrangement direction of the character sequence can be changed within a range from 0 to 360 degrees.

When a marking of a set of parts-data has completed, the marking head 51 is returned to the original upper position by the pneumatic cylinder device 41, and then the marking apparatus NC unit 83 transmits a marking end signal to the punch press NC unit 29.

Thereafter NC processing program (codes) for punching processing is transmitted (down loaded) from the marking apparatus NC unit 83 to the punch press NC unit 29. Here the NC processing program for punching processing may be comprised of G-codes and M-codes. On the basis of the NC processing program, the NC turret punch press performs a punch processing.

Vibration generated by punch processing in the punch press can be reduced by the damping rubber 35 interposed between the first mount base plate 33 and the second mount base plate 37. Thus the making head 51, the X-axis drive motor 69 and the Y-axis drive motor 75 are prevented from being subjected to severe vibration.

Figure 6:
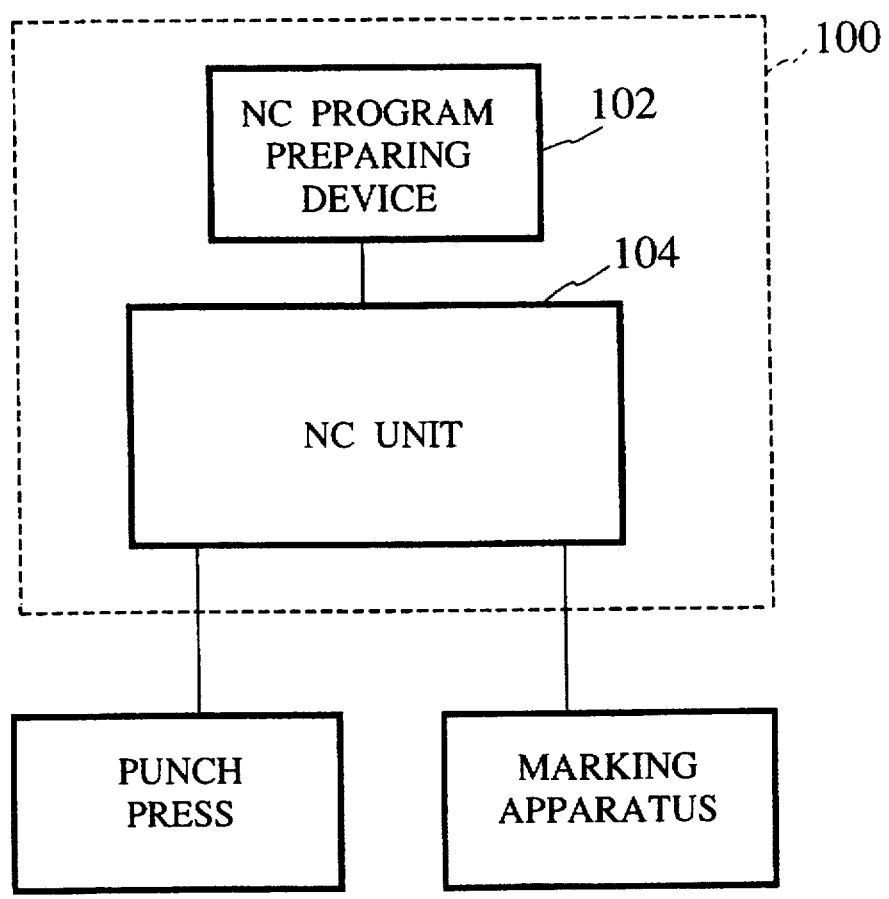
FIG. 6 is a second embodiment of a control system for controlling the machine tool and the marking apparatus.

FIG. 6 illustrates a second embodiment of the control system 100 for controlling the turret punch press and the marking apparatus. In the control system 100, the NC program for controlling both the turret punch press and the marking apparatus is prepared by an NC program preparing device 102. The prepared NC program is transmitted to a general NC unit 104 for controlling the punch press and marking apparatus.

Figure 7A:
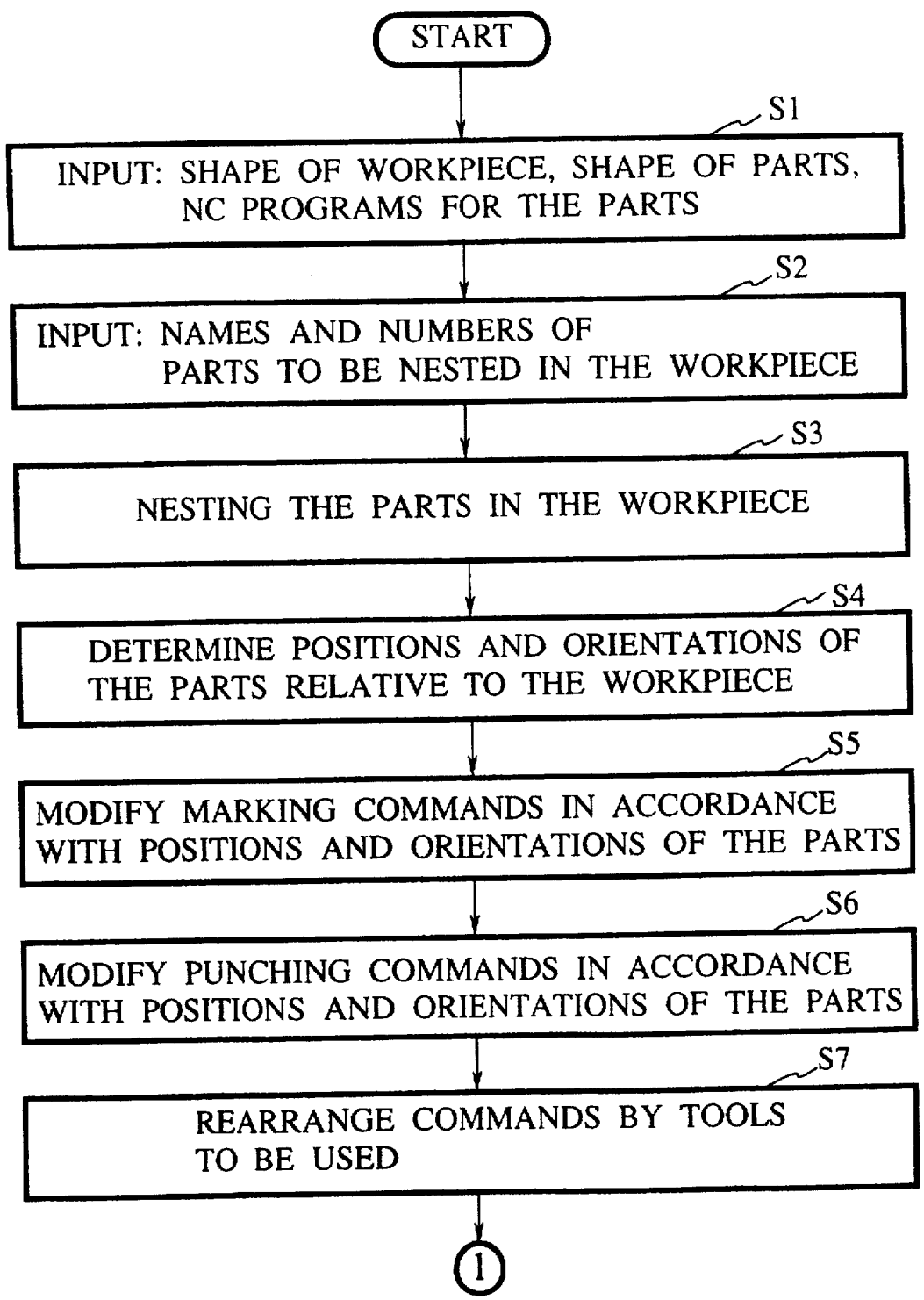
FIGS. 7A and 7B are flow chart representing the operation of the second embodiment of the control system shown in FIG. 6.
Figure 7B:
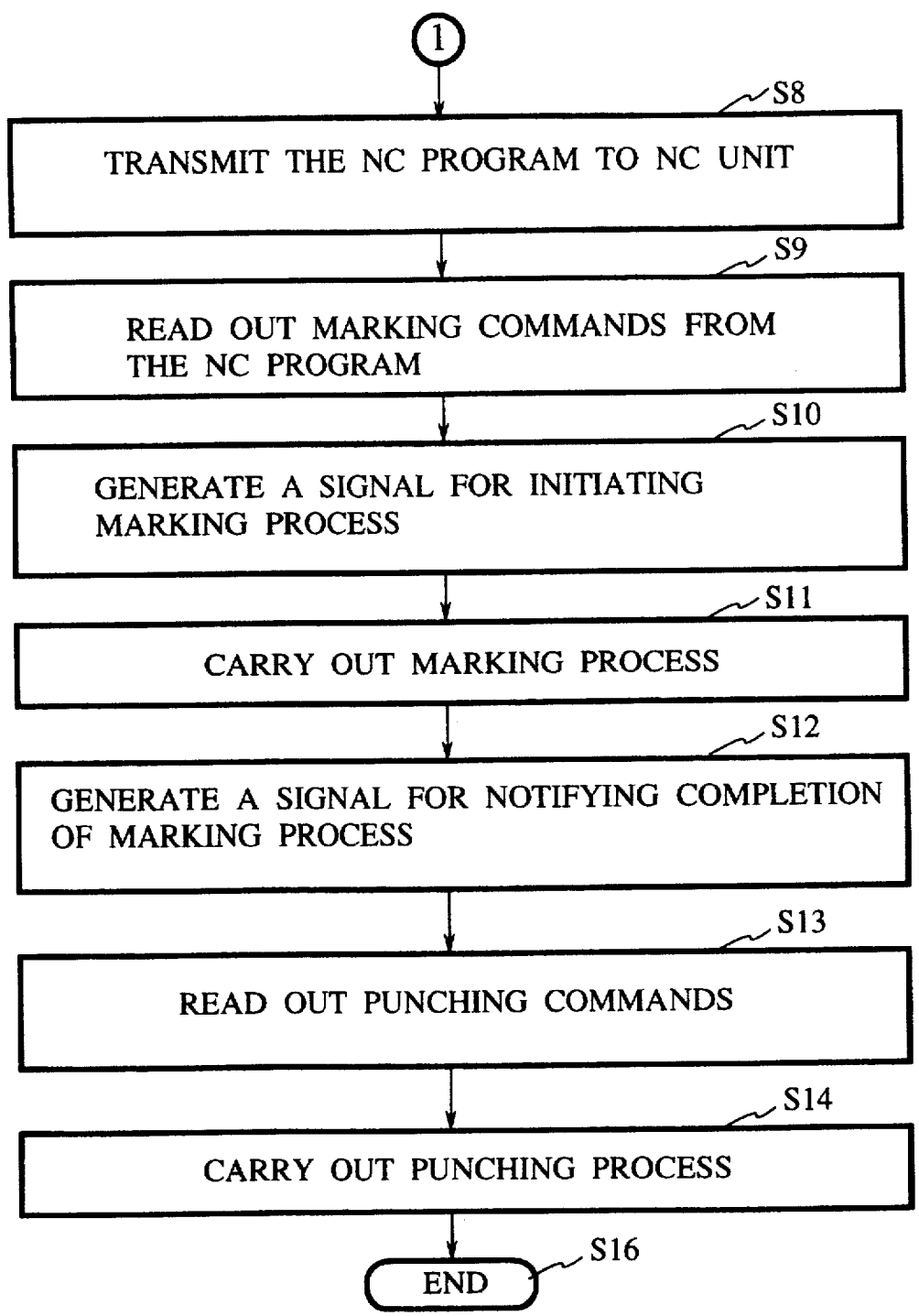
Figure 8:
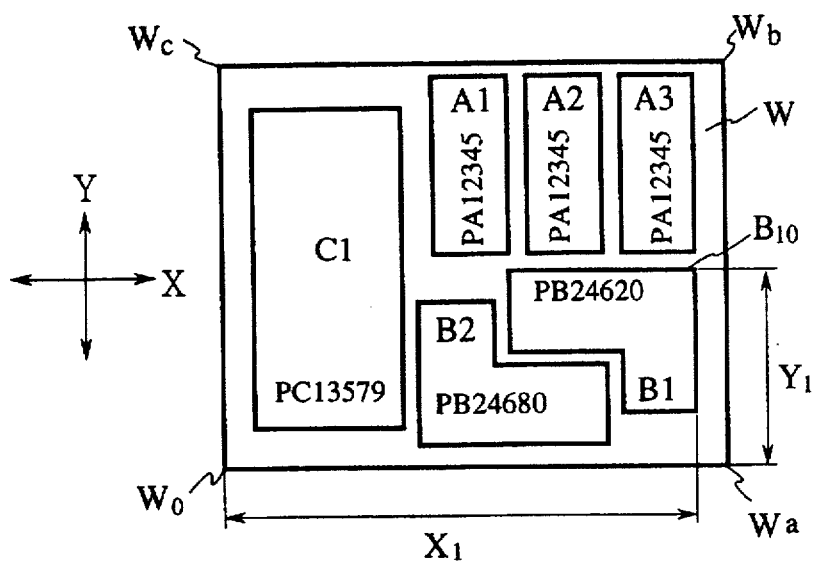
FIG. 8 shows an example of a workpiece processed by the machine tool and the marking apparatus in accordance with the present invention.
Figure 9A:
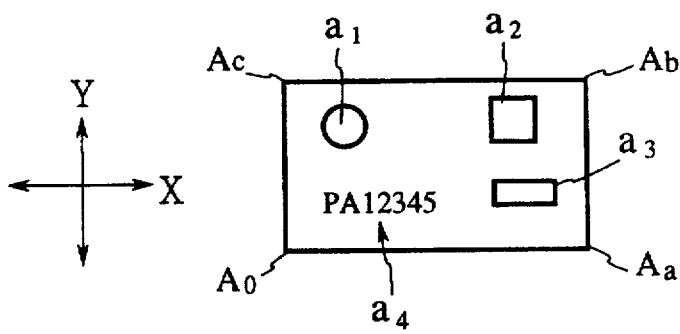
FIGS. 9A, 9B and 9C are examples of workpiece parts to be produced from a workpiece by means of the machine tool and the marking apparatus in accordance with the present invention.
Figure 9B:
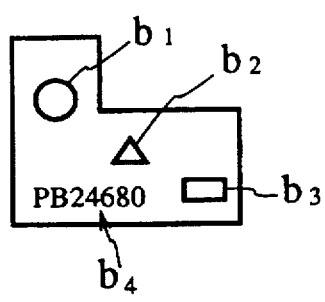
Figure 9C:
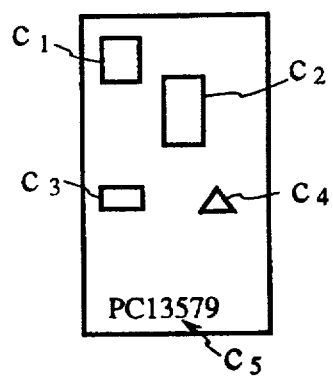

FIGS. 7A and 7B represent an operation of the control system 100. It is assumed that by the operation of control system, a workpiece is processed in a manner as illustrated in FIG. 8. That is, it is assumed that the workpiece W is formed with seven workpiece parts (or blanks) A1, A2, A3, B1, B2 and C1. Here, the parts A1, A2 and A3 are assumed to have the same configuration, and the part B1 has the same configuration as the part B2. FIG. 9A illustrates the detailed configuration of the parts A1, A2 and A3. FIG. 9B illustrates the detailed configuration of the parts B1 and B2, and FIG. 9C illustrates the detailed configuration of the part C1. Specifically, as illustrated in FIG. 9A, each of the parts A1, A2 and A3 is formed with punch holes a1, a2 and a3 and a mark a4. Similarly, each of the parts B1 and B2 is formed with punch holes b1, b2 and b3 and a mark b4; and the part C1 formed with punch holes c1, c2, c3, c4 and a mark c5.

Referring now to FIG. 7A and 7B, in a first step S1, the process is started, and information is input including the shape of the workpiece W, the shapes of the parts A1, A2, A3, B1, B2 and C1, and NC programs for the parts A1, A2, A3, B1, B2 and C1. The shape of the workpiece W is defined by the positions of the corners Wa, Wb, Wc relative to the lower left corner W0, which may be regarded as the origin of the workpiece W (FIG. 8). Similarly, the shape of the parts A1, A2 or A3 is defined by the positions of corners Aa, Ab, Ac relative to the lower left corner A0, which may be regarded as the origin of the part (FIG. 9A), and so on. The NC program for the parts A1, A2 or A3 is defined, for example, as follows:

| 001 | G92 | |
|---|---|---|
| 002 | X (XA1), | Y (YA1), T1 (tool: circle) |
| 003 | X (XA2), | Y (YA2), T2 (tool: square) |
| 004 | X (XA3), | Y (YA3), T3 (tool: rectangle) |
| 005 | $ MARK, | X (X), Y (Y), XT (XT), YT (YT), XR ( ), YR ( ), A (0), F (1), I (0), S (0.25), T (PA12345), R () |
| 006 | G50 | |

Here, the commands G92 and G50 on lines 001 and 006 indicate the start and end of the program. The commands "X (XA1), Y (YA1), T1(tool: circle)" on line 002 indicates that a punching is performed by a circular tool T1 at a position (XA1, YA1) in the part A1, A2 or A3, wherein XA1 and YA1 are X- and Y- coordinates of the position of the punch hole a1 relative to the origin A0 of the part (see FIG. 9A). Similarly, the command "X (XA2), Y (YA2), T2(tool: square)" on line 003 indicates a punching performed by a square tool T2 at a position (XA2, YA2) in the part, and the commands "X (XA3), Y (YA3), T3(tool: rectangle)" on line 004 indicates a punching performed by a rectangular tool T3 at a position (XA3, YA3) in the part; with these latter commands, the punch holes a2 and a3 are formed in the part A1, A2 or A3, as shown in FIG. 9A.

The command,

| $ MARK, | X (X), Y (Y), XT (XT), YT (YT), XR ( ), YR ( ), A (0), F (1) I (0), S (0.25), T (PA12345), R ( ), |
|---|---| on line 005 is a marking command. The meaning of respective terms in the marking command are as follows.

The first term, $MARK indicates that the terms following it relate to marking operation.

The second and third terms, X(X) and Y(Y) indicate that the workpiece is moved by a distances X and Y in the Y- and X- directions before the marking operation, so that a portion of a workpiece located under the striker 17 is moved to a home position of the marking apparatus.

The forth term, XT(XT) indicates that a marking is performed in letter and its mark (i.e. letter mark) starts at a position XT in the X-direction relative to the origin A0 of the part A1, A2 or A3. That is, in the example shown in FIG. 9A, the letter P is located at a position XT in the X-direction relative to the origin A0.

The fifth term, YT (YT) similarly indicates that the letter mark starts at a position YT in the Y-direction relative to the origin A0 of the part.

The sixth and seventh terms, XR ( ), YR ( ) indicate that a marking is performed in a graph and its mark starts at a certain position in the X- and Y- directions relative to the origin A0 of the part A1, A2 or A3. In the present example, no value is in the parentheses, and no graphic marking is performed as shown in FIG. 9A.

The eighth term, A(0) indicates an angle that a line formed by marked letters makes with a reference side A0-Aa of the part (FIG. 9A). In the present example, a line formed by the letters, "PA123452" makes the angle of 0 degree with the reference side A0-Aa of the part.

The ninth term, F(1) indicates a selection of font for a letter mark; in the present example, a font defined by the number 1 is selected from a plurality of fonts stored in a memory for the letter mark.

The tenth term, I(0) indicates that the inch system is used as measurement system for measuring the size of a mark; if I(1), the metric system is used.

The eleventh term, S(0.25) indicates that the height of the letter is 0.25 inch.

The twelfth term, T(PA12345) indicates that the letters "PA12345" is marked in a part.

The thirteenth term, R( ) indicates that a certain graph is selected for graphic marking from a plurality of graphs stored in a memory. In the present example, no value in the parenthesis, and no graphic marking is performed.

Referring again to FIG. 7A, in step S2, information is input including names and numbers of parts A, B, C to be arranged or nested in the workpiece W. In the present example, it is input that the three parts A1, A2 and A3, the two parts B1 and B2 and the part C1 are nested in the workpiece W.

In step S3, the three parts A1, A2, A3, the two part B1, B2, and the part C1 are nested in the workpiece W in accordance with the shapes and numbers of the parts. The method of nesting various small parts in a workpiece has been disclosed in prior arts, such as JP 60-28572 B and JP 60-47045 B.

In step S4, positions and orientations of the parts nested in the workpiece are calculated on the basis of information obtained in step S3. Specifically, for example, the position of the lower left corner (e.g. A0) of each part A1, A2, A3, B1, B2, C1 relative to the lower left corner W0 of the workpiece, and the angle which the reference side (e.g. the side defined by the line A0-Aa) of each part A1, A2, A3, B1, B2, C1 makes with the reference side W0-Wa of the workpiece W are calculated.

In step S5, the marking commands input in step 1 are modified in accordance with the positions and orientations of the parts relative to the workpiece obtained in step S4, to prepare the marking commands for the parts A1, A2, A3, B1, B2, and C1 nested in the workpiece. For example, the marking command for the part A1 is modified and prepared as follows:

| $ MARK, | X (X), Y (Y), XT (-YT + A1x), YT (XT + A1y), XR ( ), YR ( ), A (90), F (1), I (0), S (0.25), T (PA12345), R ( ), |
|---|---| wherein A1x and A1y are X- and Y- coordinates of the corner A0 of the plate A1 relative to the corner W0 of the workpiece W.

In step S6, the punching commands, which are input in step 1, are modified in accordance with the position and orientation of the parts relative to the workpiece obtained in step S4, to prepare punching commands for the parts A1, A2, A3, B1, B2, and C1 nested in the workpiece. For example, the punching command for the punch hole a3 of the part A1 is modified and prepared as follows:

X (-YA3+A1x), Y (XA3+A1y), T3 (tool: rectangle).

In step S7, all the commands are rearranged by the tools—including the marking tool—to be used. As a result, the following NC program is prepared.

| 011 | G 92 (for marking process) | |
|---|---|---|
| 012 | $ MARK, | X (X), Y (Y), XT (-YT + A1x), YT (XT + A1y), XR ( ), YR ( ), A (90), F (1), I (0), S (0.25), T (PA12345), R ( ), |
| 013 | $ MARK, | X (X), Y (Y), XT (-YT + A2x), YT (XT + A2y), XR ( ), YR ( ), A (90), F (1), I (0), S (0.25), T (PA12345), R ( ), |
| 014 | $ MARK, | X (X), Y (Y), XT (-YT + A3x), YT (XT + A3y), XR ( ), YR ( ), A (90), F (1), I (0), S (0.25), T (PA12345), R ( ), |
| 015 | $ MARK, | X (X), Y (Y), XT (-XT + B1x), YT (-YT + B1y), XR ( ), YR ( ), A (180), F (1), I (0), S (0.25), T (PB24680), R ( ), |
| 016 | $ MARK, | X (X), Y (Y), XT (XT + B2x), YT (YT + B2y), XR ( ), YR ( ), A (0), F (1), I (0), S (0.25), T (PB24680), R ( ), |
| 017 | $ MARK, | X (X), Y (Y), XT (XT + C1x), YT (YT + C1y), XR ( ), YR ( ), A (0), F (1), I (0), S (0.25), T (PC13579), R ( ), |

-continued (For punching process by tool T1)

| | | |
|---|---|---|
| 018 | X (−YA1 + A1x), Y (XA1 + A1y), T1 (tool: circle) | |
| 019 | X (−YA1 + A2x), Y (XA1 + A2y), T1 (tool: circle) | |
| 021 | X (−YA1 + A3x), Y (XA1 + A3y), T1 (tool: circle) | |
| 022 | X (−XB1 + B1x), Y (−YB1 + B1y), T1 (tool: circle) | |
| 023 | X (XB1 + B2x), Y (YB1 + B2y), T1 (tool: circle) | |

(For punching process by tool T2)

| | |
|---|---|
| 024 | X (−YA2 + A1x), Y (XA2 + A1y), T2 (tool: square) |
| 025 | X (−YA2 + A2x), Y (XA2 + A2y), T2 (tool: square) |
| 026 | X (−YA2 + A3x), Y (XA2 + A3y), T2 (tool: square) |
| 027 | X (XC1 + C1x), Y (YC1 + C1y), T2 (tool: square) |

(For punching process by tool T3)

| | |
|---|---|
| 028 | X (−YA3 + A1x), Y (XA3 + A1y), T3 (tool: rectangle 1) |
| 029 | X (−YA3 + A2x), Y (XA3 + A2y), T3 (tool: rectangle 1) |
| 030 | X(−YA3 + A3x), Y (XA3 + A3y), T3 (tool: rectangle 1) |
| 031 | X (−XB3 + B1x), Y (−YB3 + B1y), T3 (tool: rectangle 1) |
| 032 | X (XB3 + B2x), Y (YB3 + B2y), T3 (tool: rectangle 1) |
| 033 | X (XC3 + C1x), Y (YC3 + C1y), T3 (tool: rectangle 1) |

(For punching process by tool T4)

| | |
|---|---|
| 034 | X (XC2 + C1x), Y (YC2 + C1y), T4 (tool: rectangle 2) |

(For punching process by tool T5)

| | |
|---|---|
| 035 | X (−XB2 + B1x), Y (−YB2 + B1y), T5 (tool: triangle) |
| 036 | X (XB2 + B2x), Y (YB2 + B2y), T5 (tool: triangle) |
| 037 | X (XC4 + C1x), Y (YC4 + C1y), T5 (tool: triangle) |
| 038 | G50 |

It is assumed that the rectangular and the triangle tools T3, T4 and T5 are indexable or rotatable on the turrets, so that these tools are suitably indexed or rotated in accordance with the NC program prepared above.

Referring now to FIG. 7B, in step S8, the NC program rearranged in step S7 is transmitted from the NC program preparing device 102 to the NC unit 104. In step S9, the marking commands are read out from the NC program. In step S10, a signal is generated to initiate the marking process. In step S11, the marking process is carried out in the parts A1, A2, A3, B1, B2 and C1 on the basis of the marking commands read out in step S9. For each time a marking process is performed in each part A1, A2, A3, B1, B2 and C1, the workpiece positioning device—that comprises the movable table 7, the carriage base 9, the carriage 11 and the clamp 13—positions the workpiece W relative to the marking head 51 of the marking apparatus on the basis of the commands "X (X), Y (Y), XT (XT), YT (YT)" included in the marking commands $MARK, so that the start position of a mark to be formed or impressed on each part is securely located just below the marking head 51.

In step S12, when the marking process is completed, a signal for notifying the completion of the marking process is generated, and the process proceeds to step 13 where the punching commands are read out from the NC program. Then in step S14, the punching process is performed on the basis of the punching commands. The process then done at step S16.

The marking apparatus for a machine tool according to the present invention can be applied to a laser processing machine, a plasma processing machine, a band saw machine, a processing machine for processing steel material such as H-shaped steel, and the like in the same way as with the case of the above NC turret punch press.

In the above description, the present invention has been described by use of only a specific embodiment by way of example. Without being limited thereto, however, it is well understood by those skilled in the art that various modifications may be made in the invention within the scope thereof.

As described above, in the marking apparatus according to the present invention, parts-data can be marked on workpiece parts in dot-matrix manner by use of a pneumatic stylus. The pneumatic stylus is movable in both first (X-axis) and second (Y-axis) directions independently from the punching motion of the tool (e.g., punch and die) mounted on the mounting stations of the machine tool. Accordingly, it is possible to mark the parts-data on a workpiece parts placed on the workpiece table at a high speed, without occupying the tool (die) mounting station and without any limitation in the direction, size, and font of the character sequence. As a result, it is possible to mark the parts-data on the workpiece parts without reducing the availability factor of the machine tool and without spending much set-up time.

Further, whenever the arrangement angles of the workpiece parts are changed by the nesting system to automatically optimize the use of the workpiece W, it is possible to mark parts-data at any desired angle according to new arrangement directions of the workpiece parts. Thus the plate material can always be used most efficiently.

Further, in the marking apparatus of the present invention, since the stylus itself is moved horizontally and the stylus is driven pneumatically at high speed, it is possible to mark parts-data at high speed, as compared when the parts-data are marked on the workpiece parts by moving the workpiece parts together with a heavy standardized workpiece material under the X-Y axis control of the workpiece table of the machine tool. Specifically, for example, the marking apparatus of the present invention can mark five characters per second, provided each character has the height of 3 mm.

Further, since the mount base member is supported by the frame via a vibration damping or insulating member (made of damping rubber), it is possible to prevent vibration being directly transmitted to the marking head during the operation of the machine tool and thereby to protect the drive motors mounted on the marking head from being damaged, thus improving the durability of the marking apparatus.

Further, since the control means for the marking apparatus is an NC unit, and the control means can pick up the marking data (i.e., meta codes $MARK) from an NC processing program, the marking operation can be executed under numerical control without preparing independently the marking data for respective workpiece parts. In other words, the marking data can be prepared easily with the aid of an NC program preparing apparatus such as automatic programming apparatus provided with CAD (computer-aided design) and/or CAM (computer-aided manufacturing) functions.

Further, the marking control means includes the marking apparatus NC unit and is connected to the machine tool NC unit in bidirectionally communicatable manner such that the marking apparatus NC unit receives a marking start command from the machine tool NC unit, and transmits a marking end command to the machine tool NC unit. Thus it is possible to securely execute the numerical control of the machine tool and the marking apparatus automatically and simultaneously so that the machine tool and the marking apparatus cooperate with each other.

What is claimed is:

1. Method of controlling a machine tool system, which includes a machine tool for performing a machining operation on a workpiece and a marking apparatus for performing a marking operation on the same workpiece, to manufacture a plurality of parts from a workpiece, each of the parts being formed with a machined section formed by the machine tool and a mark formed by the marking apparatus, the method comprising the steps of:

(a) preparing a control program for controlling the machine tool and marking apparatus, the control program including a plurality of partial programs each of which is for each of the parts, and each partial program including first commands for forming a machined section on each part and second commands for forming a mark on said part; and (b) delivering the control program to an NC control system for controlling the operation of the machine tool and the marking apparatus;

(c) machining each part;

(d) marking each part at a separate location from the location where said machining step is performed; said machining operation and said marking operation being performed independently under control of the control program.

2. The method of claim 1, wherein each of the partial programs includes commands which indicate a start and an end of the partial program.

3. The method of claim 1, further comprising the steps of:
 a) nesting each of the parts in the workpiece in accordance with shapes of the parts; and
 b) modifying the first and second commands for each of the parts in accordance with position and orientation of each of the parts.

4. The method of claim 3, further comprising the step of:
 (c) rearranging the first and second commands by tools to be used.

5. Apparatus for controlling a machine tool system, which includes a machine tool for performing a machining operation on a workpiece and a marking apparatus for performing a marking operation on the same workpiece, to manufacture a plurality of parts from a workpiece, each of the parts being formed with a machined section formed by the machine tool and a mark formed by the marking apparatus, the apparatus comprising:

means for preparing a control program for controlling the machine tool and marking apparatus, the control program including a plurality of partial programs each of which is for each of the parts, and each partial program including first commands for forming the machined section on each part and second commands for forming the mark on said part;

means for nesting each of the parts in the workpiece in accordance with shapes of the parts;

means for modifying the first and second commands for each of the parts in accordance with position and orientation of each of the parts nested in the workpiece; and means for delivering the control program to an NC control system for controlling the operation of the machine tool and the marking apparatus;

means for machining each part;

means marking each part at a separate location from the location where said machining step is performed;

said machining operation and said marking operation being performed independently under control of the control program.

6. A method of controlling a machine tool system, which includes a machine tool for performing machining operation on a workpiece and a marking apparatus for performing a marking operation on the same workpiece, to manufacture a plurality of parts from a workpiece, each of the parts being formed with a machined section formed by the machine tool and a mark formed by the marking apparatus, wherein the machine tool includes:

a frame;

a worktable mounted on the frame, for supporting the workpiece;

a processing tool for performing a machining operation on the workpiece; and a device for positioning a workpiece relative to the processing tool; and wherein the marking apparatus includes:

a mount base mounted on the frame of the machine tool;

a stylus body supported by the mount base for moving in a direction perpendicular to a surface of the worktable;

a carriage supported by the stylus body for moving in a first direction parallel to the surface of the worktable;

a stylus support supported by the carriage for moving in a second direction perpendicular to the first direction and parallel to the surface of worktable; and a pneumatic stylus supported by said stylus support so as to face the surface of the worktable;

means for machining each part;

said stylus marking each part at a separate location from the location where said machining step is performed;

said machining operation and said marking operation being performed independently under control of an NC control program;

the method comprising:

positioning the workpiece relative to the marking apparatus by the device for positioning a workpiece relative to the processing tool; and performing a marking operation on the workpiece by striking the workpiece by the pneumatic stylus while moving the stylus in the first and second directions;

preparing a control program for controlling the machine tool and marking apparatus, the control program including a plurality of partial programs each of which is for each of the parts, and each partial program including first commands for forming a machined section on each part and commands for forming a mark on said part; and delivering the control program to an NC control system for controlling the operation of the machine tool and the marking apparatus;

machining each part;

marking each part at a separate location from the location where said machining step is performed; said machining operation and said marking operation being performed independently under control of the control program.

7. The method of controlling a machine tool system of claim 6, the marking apparatus further comprising:

a vertical actuator mounted on said mount base, for reciprocatingly moving said stylus body in the vertical direction;

a first actuator mounted on said stylus body, for moving said carriage in the first direction;

a second actuator mounted on said carriage, for moving said stylus support member in the second direction; and marking apparatus control means for controlling operation of said vertical, first, and second actuators, respectively on the basis of marking data.

8. The method of controlling a machine tool system of claim 6, wherein said mount base is supported on said frame via at least one vibration insulating member.

9. The method of controlling a machine tool system of claim 6, wherein said marking apparatus control means is an NC unit for retrieving marking data from NC processing program including NC program for the machine tool.

10. The method of controlling a machine tool system of claim 9, wherein the machine tool is provided with a machine tool NC unit, and said marking apparatus control means is connected to said machine tool NC unit to receive a marking start command signal from the machine tool NC unit and to send a marking end command signal to the machine tool NC unit.

11. The method of controlling a machine tool system of claim 6, wherein the machine tool is a punch press.

12. The method of controlling a machine tool system of claim 11, wherein a workpiece positioning device for positioning a workpiece relative to the processing means is adapted to position the workpiece relative to a marking apparatus.

* * * * *